Jan. 3, 1961     H. H. JOHNSON     2,966,747
EDUCATIONAL DEVICE FOR TEACHING ARITHMETIC
Filed May 4, 1959
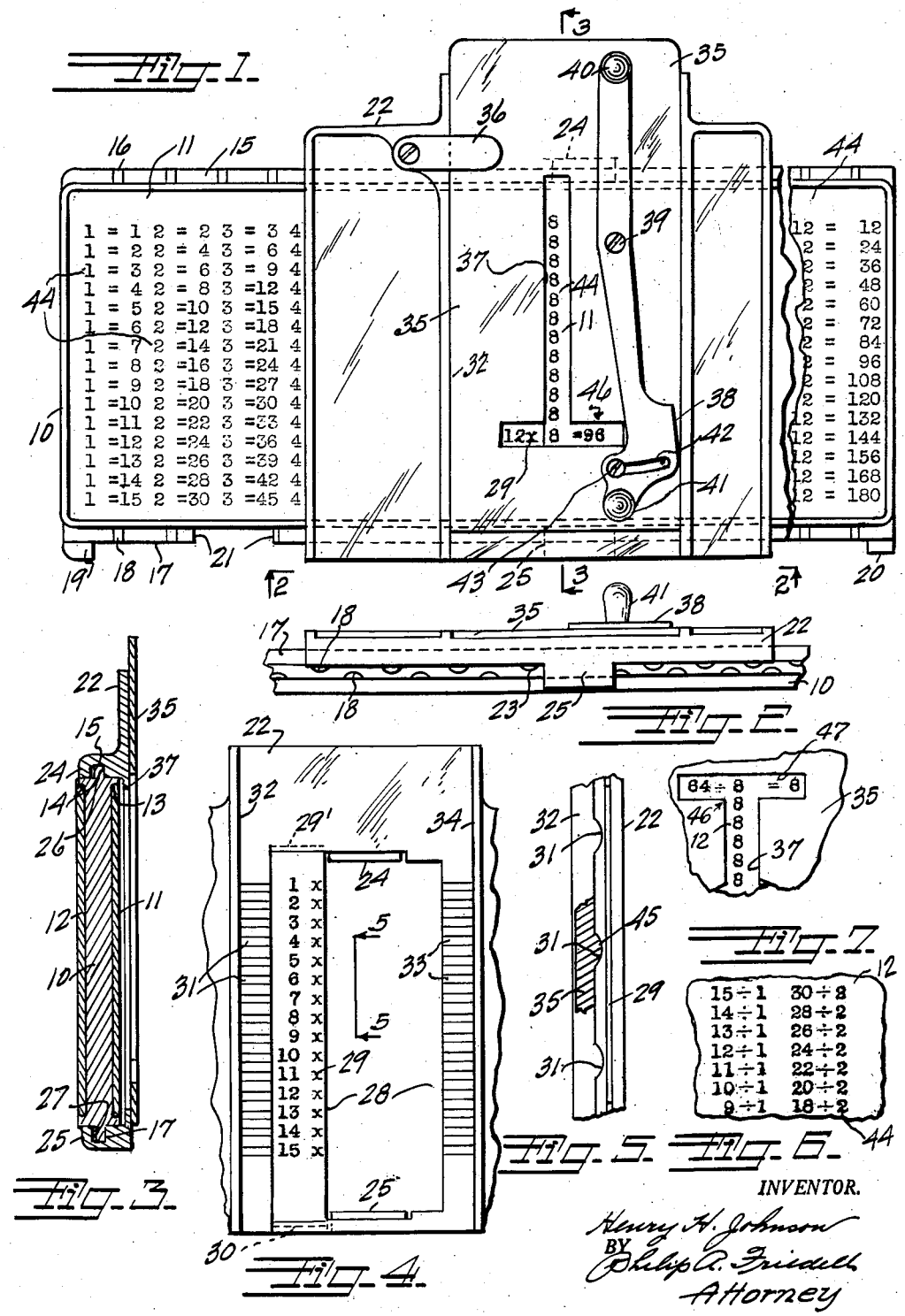
INVENTOR.
Henry H. Johnson
BY Philip A. Friedell
Attorney

2,966,747
EDUCATIONAL DEVICE FOR TEACHING ARITHMETIC

Henry H. Johnson, 494 58th St., Oakland, Calif.

Filed May 4, 1959, Ser. No. 810,948

12 Claims. (Cl. 35—31)

This invention relates to new and useful improvements in educational devices, and particularly to an educational device adapted for the use of persons having poor education, and to children for use simultaneously as an educational device, toy, and game.

The objects and advantages of the invention are as follows:

First, to provide an educational device which is particularly adapted to the use of poorly educated adults, and to children.

Second, to provide a device as outlined which can be simultaneously used as an educational device, toy, and game for children.

Third, to provide a device as outlined with interchangeable charts for conversion to various arithmetical problems.

Fourth, to provide a base with different arithmetical charts on front and back, and to provide a slide which can be quickly and easily transferred between the front and the back of the base.

In describing the invention reference will be had to the accompanying drawings, in which:

Fig. 1 is a plan view of the invention with a portion of the base broken out.

Fig. 2 is a fragmentary view of the lower end of the base and slide.

Fig. 3 is a section taken on line 3—3 of Fig. 1.

Fig. 4 is a fragmentary plan view of the main or horizontal slide with the vertical or secondary slide removed.

Fig. 5 is an enlarged end view of the vertical slide registration means and is viewed in the direction 5—5 on Fig. 4.

Fig. 6 is a fragmentary view of a division chart.

Fig. 7 is a fragmentary view showing the vertical slide as inverted and transferred to the reverse side of the base for use of a division chart.

The invention includes a base 10 which is recessed on front and back to receive arithmetical charts 11 and 12 as indicated at 13 and 14, to permit the charts to be substituted or replaced at will, the upper edge being provided with a tongue 15 which is provided with spaced transverse groove 16, and the lower edge also being provided with a tongue 17 provided with equally spaced grooves 18, and formed in both sides of the tongues, one of the tongues, such as the lower tongue 17 having a stop at each end as indicated at 19 and 20, and also having a portion of the tongue removed as indicated at 21, to provide a release passage for the main slide.

The charts 11 and 12 may be arranged for any of the various arithmetical problems, chart 11 being a multiplication chart having a range of 0 to 12, though not so limited as any other series can be covered as desired.

For multiplication, the multiplier, the equal sign and the product are on the chart, while the multiplicand and the multiplication sign are on the main slide as shown in Figs. 1 and 4, while in division the dividend, the division sign and the divisor are on the chart, with the equal sign and the quotient on the main slide as shown fragmentarily in Fig. 6, and the vertical or transverse slide is inverted and transferred to the reverse side of the base.

The main slide 22 has a single bead 23 at each, the upper and lower ends, to cooperate with the grooves 16 and 18 in the top or undersurfaces of the tongues for suitably registering the various factors or combinations on the charts as will be later explained, and has a drop section at each, the upper and lower end as indicated at 24 and 25, each having a groove as indicated at 26 and 27 to slidably fit the tongues, and having a length slightly less than the length of the recess 21 to permit removal of the slide for inversion or transfer to the back of the instrument.

Referring to Fig. 4 in which the transverse slide has been removed, it will be noted that a relatively wide opening 28 is provided and which extends throughout the height of the base, and that an indexing chart 29 is removably mounted with one edge coincident with one edge of the opening 28, this chart having imprinted on one side a series of multiplicands each with the multiplication sign, and on the other side a similar series of quotients with the equal sign, as indicated respectively in Figs. 4 and 7, this indexing chart being suitably removably mounted, as by springing the upper and lower ends into shallow grooves indicated at 29′ and 30. A series of indexing grooves 31 are formed from the outer edge of the indexing chart to the guide wall 32, and a similar series of grooves 33 is formed from the edge of the other side of the opening to the opposite guide wall 34.

The transverse slide 35 slidably fits between the guide walls 32 and 34 and is retained by a spring 36, and has a T-shaped opening 37 formed therethrough, the leg of the opening disclosing the series of intermediate factors, while the head of the T discloses the complete problem.

The blind 38 is pivoted at 39 to the transverse slide and has a knob at each end as indicated at 40 and 41, the lower end having an arcuate slot 42 struck to a radius from the pivot 39, the screw 43 guiding and limiting movement of the blind to clear or cover only the answer to a problem, and converts the device into a game particularly for children.

As is perfectly obvious, the main slide can be fixed in position, as by mounting on a support, with the chart slidable thereunder, in which case the chart can be made of any desired length or in the form of a cylinder to be rotated back of the main guide, the structure not being shown or illustrated as it would limit operation to a single type of problems, while with that shown, one type can be provided on the face, and another on the back of the base.

The chart is provided with a multiplicity of vertical series of triple columns including each two factors and one sign of arithmetic problems, in series, while the main slide or indexing member is provided with a double column of the other factors and signs of the arithmetic problems, all of the intermediate factors 44 being visible through the leg portion of the T-slot, while all three factors and the two signs are visible through the head portion of the T-slot when the indexing member and the transverse slide are positioned over the chart for the specific problem.

A division chart is fragmentarily illustrated in Figs. 6 and 7 and shows the main slide as inverted and transferred to the reverse side of the base for problems in division, as is indicated by the position of the cross slot or head of the T-slot which is located at the top end of the leg. For transfer, the chart 29 is removed, reversed and replaced to disclose the equal signs and quotients for coordination with the dividends, division signs and divisors on the chart on the base.

It will be noted that the sum of the multipliers visible in the window is equal to the product, and that the number of multipliers visible in the window 37 is equal to the multiplicand, thus providing a new concept through comparison of the number of multipliers visible with the number of the multiplicand, and further, through addition of the visible multipliers providing a comparison with the product, thereby linking addition to multiplication. Thereby a more thorough understanding of multiplication evolves.

For operation, the main slide or indexing member and the chart are relatively adjusted to where the intermediate factor 44 is visible through the vertical window 37, and the transverse slide is adjusted to the problem to be solved as viewed through the head portion 47 of the window, in which position the complete problem including the answer is directly readable as indicated at 46.

Through the use of the blind 38, children can use this instrument as a game, with one child selecting the problem and covering the answer with the blind while the other child endeavors to provide the correct answer, the first child then retracting the blind to reveal the correct answer. Thus the instrument will function as an educational device, as a toy, and as a game.

It will also be noted that the transverse slide is provided with ridges 45 to engage in the grooves 31 and 33 for suitably indexing the problem to be solved.

I claim:

1. An educational device comprising a chart having a multiplicity of vertical triple column series including each two columns of factors of arithmetic problems and one column of one of the artithmetic signs, an indexing member having one column of the other factors of the arithmetic problems and an adjoining column of the other arithmetic signs, said chart and said indexing member being adjustable one relative to the other, and a slide transversely adjustable in said indexing member and having a transversely formed T-slot therein including a leg portion and a head portion, and with one column of the chart visible through the leg portion of the slot and the complete problem visible through the head portion of the slot to provide the answer to the problem.

2. A device as defined in claim 1, a blind mounted on said slide and movable to two positions, in one of which one end of the head portion of the T-slot is covered to conceal the answer, and in the other of which the head portion is completely uncovered to disclose the answer to the problem.

3. A device as defined in claim 2, indexing means cooperative between the transverse slide and the indexing member for positive registry of the head portion of the T-slot with the selected problem, and resilient retaining means cooperative between the transverse slide and the indexing member for retaining the transverse slide in any adjusted position.

4. An educational device comprising a base, a chart mounted on said base and having a multiplicity of spaced triple column series vertically arranged, each triple column series consisting of two columns of factors and an intermediate column of one species of arithmetic signs with one of said two columns comprising intermediate factors, a main slide slidably mounted on said base having two vertically arranged columns including a column of factors and a column of another species of arithmetic signs, and a transverse slide slidably mounted in said main slide and having a T-shaped opening formed therethrough and consisting of a leg portion and a head portion with one of said two columns of factors visible throughout the height of the leg portion, and a complete problem including the elements of five columns visible in the head portion of the T-shaped opening.

5. A structure as defined in claim 4, said base having a tongue formed throughout the length of the base on one edge and a similar tongue formed on the opposite edge with a portion removed to form a gap, and said main slide having a depending member having a length slightly less than the length of said gap and formed at each end and each having a groove to cooperate with the tongues, and said base having a second chart on the reverse side having a similar multiplicity of spaced columns of factors and arithmetic signs of a different species, with said main slide removable and invertedly transferable from one side to the other, at will.

6. A structure as defined in claim 4, said base having a reverse side having a chart of a second species of arithmetic factors and signs said main slide having an indexing chart on which said two columns are impressed and having a reverse side, retaining means on said main slide for retaining said indexing chart in position, said indexing chart having the others of said second species of factors and arithmetic sign impressed on its reverse side and being removable, and reversible for coordination with the chart on the reverse side of said base.

7. A structure as defined in claim 4, resilient holddown means cooperative between the main slide and the transverse slide, said main slide having spaced indexing ridges formed thereon and said transverse slide having registrable grooves for registry of the elements of a problem in the head portion of the T-shaped opening.

8. A structure as defined in claim 4, a blind mounted on said transverse slide and extendable over said head portion of said T-shaped opening and movable to two positions in one of which the head portion is unobstructed, and in the other of which the one end of the head portion is covered to conceal the answer to the problem.

9. An educational device comprising a base provided with a chart having a multiplicity of vertical column series of indicia, each series including a column of identical multipliers, an intermediate column of equal signs, and a column of products beginning at the top with the value of the multiplier and therefrom increasing in each line below by the value of the multiplier, an indexing member slidable longitudinally of the base and having a vertical series of multiplicands beginning at the top with the numeral 1 and increasing by 1 throughout the vertical series, each multiplicand provided with a multiplication sign, said indexing member and said base with its chart being adjustable one relative to the other with the lines of factors on the indexing member registrable with the lines on the chart, indexing means cooperative between the base and the indexing member for locating the multiplication sign column on the indexing member to the left of any column of multipliers, and a transverse slide in said indexing member and having an inverted T-shaped window therein including a leg portion and a head portion, indexing means cooperative between the indexing member and the transverse slide for registering the said head portion selectively with the respective lines on the chart with the multiplicand and the multiplication sign visible through the left side of said head portion, the upper portion of the series of multipliers through the said leg portion, and the equal sign and the product through the right hand side of the said head portion.

10. A device as defined in claim 9, a blind mounted on said transverse slide and movable to two positions, in one of which the blind covers the answer in the head portion of the T-shaped window, and in the other of which the answer is revealed.

11. A device as defined in claim 10, resilient means cooperative between the indexing member and the transverse slide for registrable retention of the transverse slide with respective problems on the chart.

12. A device as defined in claim 11, said base having a tongue formed throughout the length thereof on one edge and a similar tongue formed on the opposite edge with a portion removed to form a gap, and said indexing member having a depending member at each, its upper and lower ends and having a length slightly less than the span of said gap and each having a groove freely fitting said tongues, stop means formed at each end of said one tongue and cooperative with the depending member for limiting relative movement between the base and the indexing member, said indexing member being limited to removal from the base when one depending member is in the position of the gap in the tongue.

References Cited in the file of this patent

UNITED STATES PATENTS 1,974,901     Stadler _____ Sept. 25, 1934